US009084950B2

(12) United States Patent
Saito et al.

(10) Patent No.: US 9,084,950 B2
(45) Date of Patent: Jul. 21, 2015

(54) FLUID FILTER

(71) Applicant: TOYOTA BOSHOKU KABUSHIKI KAISHA, Aichi-ken (JP)

(72) Inventors: Yasuhiro Saito, Tokoname (JP); Haruaki Sakata, Nisshin (JP); Toshiaki Mori, Kariya (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 297 days.

(21) Appl. No.: 13/645,846

(22) Filed: Oct. 5, 2012

(65) Prior Publication Data
US 2013/0146526 A1    Jun. 13, 2013

(30) Foreign Application Priority Data

Dec. 7, 2011    (JP) ................... 2011-268379

(51) Int. Cl.
*B01D 29/07* (2006.01)
*B01D 29/52* (2006.01)
*B01D 35/027* (2006.01)
*F16H 57/04* (2010.01)

(52) U.S. Cl.
CPC ............... *B01D 29/07* (2013.01); *B01D 29/52* (2013.01); *B01D 35/0273* (2013.01); *B01D 2201/127* (2013.01); *F16H 57/0404* (2013.01)

(58) Field of Classification Search
None
See application file for complete search history.

(56) References Cited

U.S. PATENT DOCUMENTS

| 2,995,253 | A | * | 8/1961 | Belgarde et al. ............ 210/323.2 |
| 4,715,870 | A |   | 12/1987 | Masuda et al. |
| 6,190,546 | B1 | * | 2/2001 | Agner ....................... 210/167.08 |
| 2005/0230324 | A1 | * | 10/2005 | Peet et al. ..................... 210/767 |
| 2006/0169632 | A1 |   | 8/2006 | Suzuki et al. |

FOREIGN PATENT DOCUMENTS

| CN | 101534923 | 9/2009 |
| DE | 20301787 | 4/2003 |
| JP | 10-272312 | 10/1998 |
| JP | 11-319436 | 11/1999 |
| JP | 2000-279718 | 10/2000 |
| JP | 2003-042272 | 2/2003 |
| JP | 2004-353783 | 12/2004 |
| JP | 2006-205133 | 8/2006 |
| JP | 2006-316902 | 11/2006 |
| WO | 2007/046946 | 4/2007 |

OTHER PUBLICATIONS

Chinese Office action dated Jun. 3, 2014, along with an English-language translation thereof.

(Continued)

*Primary Examiner* — Benjamin Kurtz
(74) *Attorney, Agent, or Firm* — Greenblum & Bernstein, P.L.C.

(57) ABSTRACT

A fluid filter including: an upper case provided with an outlet hole; a lower case provided with an inlet hole; and a filter element held between the upper case and lower case, wherein the outlet hole and the inlet hole are arranged opposite to each other. The filter element includes a first filter material which is folded and arranged in a communication part connecting the outlet hole and the inlet hole, and a second filter material which is folded and spaced apart from the communication part, and the retention interval L1 of the first filter material in the fold line direction is smaller than the retention interval L2 of the second filter material in the fold line direction.

12 Claims, 11 Drawing Sheets

(56) References Cited

OTHER PUBLICATIONS

U.S. Appl. No. 13/523,002 to Yasuhiro Saito et al., which was filed on Jun. 14, 2012.

Chinese Official Action for CN App. No. 201210387593.2 dated Dec. 3, 2014, along with an English-language translation thereof.
Japanese Official Action for JP2011-268379 dated Mar. 31, 2015, along with an English-language translation thereof.

* cited by examiner

FLUID FILTER

CROSS-REFERENCE TO RELATED APPLICATIONS

The present application claims priority under 35 U.S.C. §119 of Japanese Application No. 2011-268379 filed on Dec. 7, 2011, the disclosure of which is expressly incorporated by reference herein in its entirety.

BACKGROUND OF THE INVENTION

1. Field of the Invention

The present invention relates to a fluid filter, and more specifically to a fluid filter which can suppress the close contact between folds of a filter material to prevent an increase in pressure loss and also can ensure the necessary filtration area to improve the filtration efficiency, even when outlet and inlet holes are arranged opposite to each other.

2. Description of the Related Art

As conventional oil filters for automatic transmissions, those having an upper case provided with an outlet hole, a lower case provided with an inlet hole, and a filter element held between the upper and lower cases are generally known (for example, see Related Art 1). The Related Art 1 discloses that outlet and inlet holes are arranged opposite to each other in the vertical direction. This layout of the inlet and outlet holes above involves the problem of reduction in filtration efficiency due to the bias generated in the flow of oil on a filtering surface, but is inevitably employed in some cases from the viewpoint of mounting requirements and the like.

Thus, it is conceivable to apply a filter element having a folded filter material to the oil filter disclosed in Related Art 1 to ensure a large filtration area within a limited space to enhance the filtration efficiency. In the case of this folded filter material 111, however, neighboring folds 111a may closely contact to each other to cause an increase in pressure loss, as shown in FIGS. 14(a) and 14(b). Especially, an outlet hole 102 and an inlet hole 104 are arranged opposite to each other in the vertical direction in the oil filter of Related Art 1, and thus a relatively high-pressure fluid would flow through a communication part 109 of a filtration chamber S which connects the outlet hole 102 and the inlet hole 104, thereby easily causing the close contact between the folds 111a of the filter material 111 in the communication part 109.

[Related Art 1] JP-A 2003-42272

SUMMARY OF THE INVENTION

The present invention has been made in light of the circumstances, and an object of the present invention is to provide a fluid filter which can suppress the close contact between folds of a filter material to prevent an increase in pressure loss and also can ensure the necessary filtration area to improve the filtration efficiency, even when outlet and inlet holes are arranged opposite to each other.

One aspect of the present embodiments provides a fluid filter including; an upper case provided with an outlet hole; a lower case provided with an inlet hole; and a filter element held between the upper case and lower case, wherein the outlet hole and the inlet hole are arranged opposite to each other, wherein the filter element comprises a first filter material which is folded and arranged in a communication part connecting the outlet hole and the inlet hole, and a second filter material which is folded and spaced apart from the communication part, and wherein the retention interval (L1) of the first filter material in the fold line direction is smaller than the retention interval (L2) of the second filter material in the fold line direction.

In a further aspect, the fold height (H1) of the first filter material is smaller than the fold height (H2) of the second filter material.

In a further aspect, a reinforcing member having an insertion part to be inserted between the neighboring folds of the second filter material is provided on the downstream side surface of the second filter material.

In a further aspect, the second filter material is lower in pressure loss than the first filter material.

In a further aspect, the fluid filter is an oil filter for an automatic transmission.

According to the fluid filter of the present invention, a filter element includes a first filter material which is folded and arranged in a communication part connecting an outlet hole and an inlet hole and a second filter material which is folded and spaced apart from the communication part. Then the retention interval (L1) of the first filter material in the fold line direction is smaller than the retention interval (L2) of the second filter material in the fold line direction. Because of this arrangement, the first filter material mainly filtering a fluid flowing in the communication part within the filtration chamber is held with a high retention force as compared with the second filter material mainly filtering a fluid flowing in a site spaced apart from the communication part within the filtration chamber. Thus, it is possible to suppress the close contact between the folds in the first filter material on the high retention side to prevent an increase in pressure loss, thereby enhancing the lifetime, namely, dust retaining amount of the filter material. Further, the necessary filtration area is easily ensured in the second filter material on the low retention side in addition to the first filter material on the high retention side, thereby making it possible to increase the filtration efficiency.

Further, when the fold height (H1) of the first filter material is smaller than the fold height (H2) of the second filter material, it is possible to more efficiently suppress the fold contact in the first filter material on the high retention side and to more efficiently ensure the filtration area necessary for the second filter material on the low retention side.

When a reinforcing member is provided on the downstream side surface of the second filter material, an insertion part of the reinforcing member is inserted between the neighboring folds of the second filter material, so that the fold contact of the second filter material on the low retention side is suppressed.

When the second filter material is lower in pressure loss than the first filter material, it is possible to prevent flow bias of a filtered fluid within the filter to enhance the filtration efficiency of the entire filter.

Furthermore, when the fluid filter is an oil filter for an automatic transmission, an automatic transmission suitably filtering oil can be realized.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DESCRIPTION OF THE EMBODIMENTS

Figure 1:
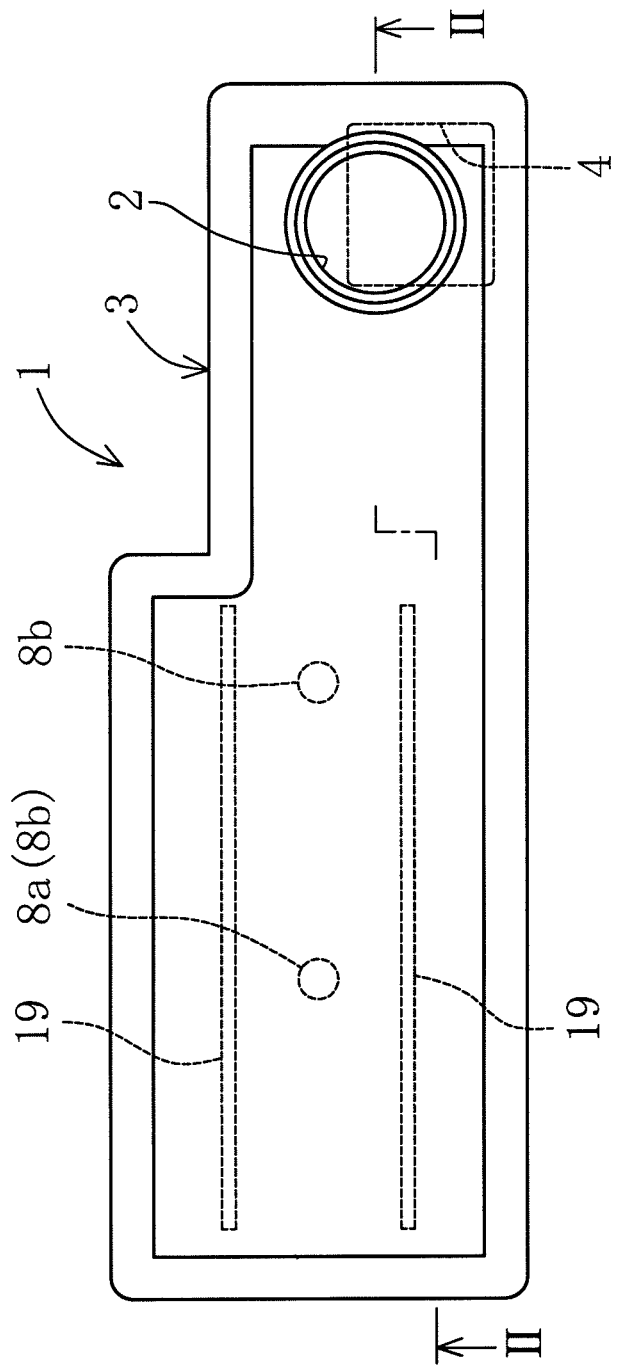
FIG. 1 is a plan view showing an oil filter for an automatic transmission according to an Example.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

1. Fluid filter

A fluid filter according to the present embodiment 1 is a fluid filter (1) including an upper case (3) provided with an outlet hole (2), a lower case (5) provided with an inlet hole (4), and a filter element (6) held between the upper and lower cases. In the fluid filter, the outlet hole and the inlet hole are arranged opposite to each other. The filter element includes a first filter material (11) which is folded and arranged in a communication part (9) connecting the outlet hole and the inlet hole, and a second filter material (12) which is folded and spaced apart from the communication part. The retention interval (L1) of the first filter material in the fold line direction (P) is smaller than the retention interval (L2) of the second filter material in the fold line direction (for example, see FIGS. 2 and 5). In the meantime, the "retention interval" is intended to mean an interval held between a pair of retaining parts (for example, retention frame, rib or the like) in the fold line direction of the filter material.

Figure 5:
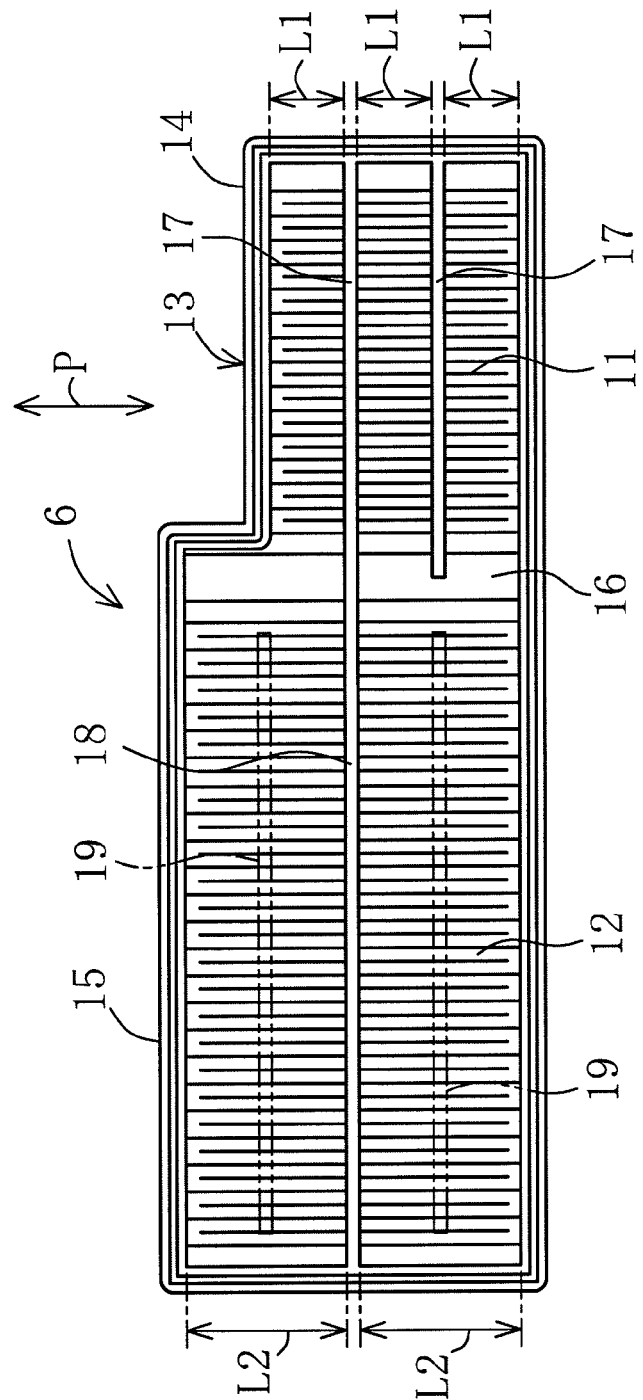
FIG. 5 is a plan view showing a filter element according to an Example.

In the case of the above embodiment, for example, the ratio (L2/L1) between the retention interval (L1) of the first filter material (11) and the retention interval (L2) of the second filter material (12) may range from 1.5 to 2.5 (preferably, 1.7 to 2.3) (for example, see FIG. 5). Thus, it is possible to more efficiently suppress the close contact between the folds (fold contact) in the first filter material and to more efficiently ensure the filtration area necessary for the first and second filter materials.

Figure 4:
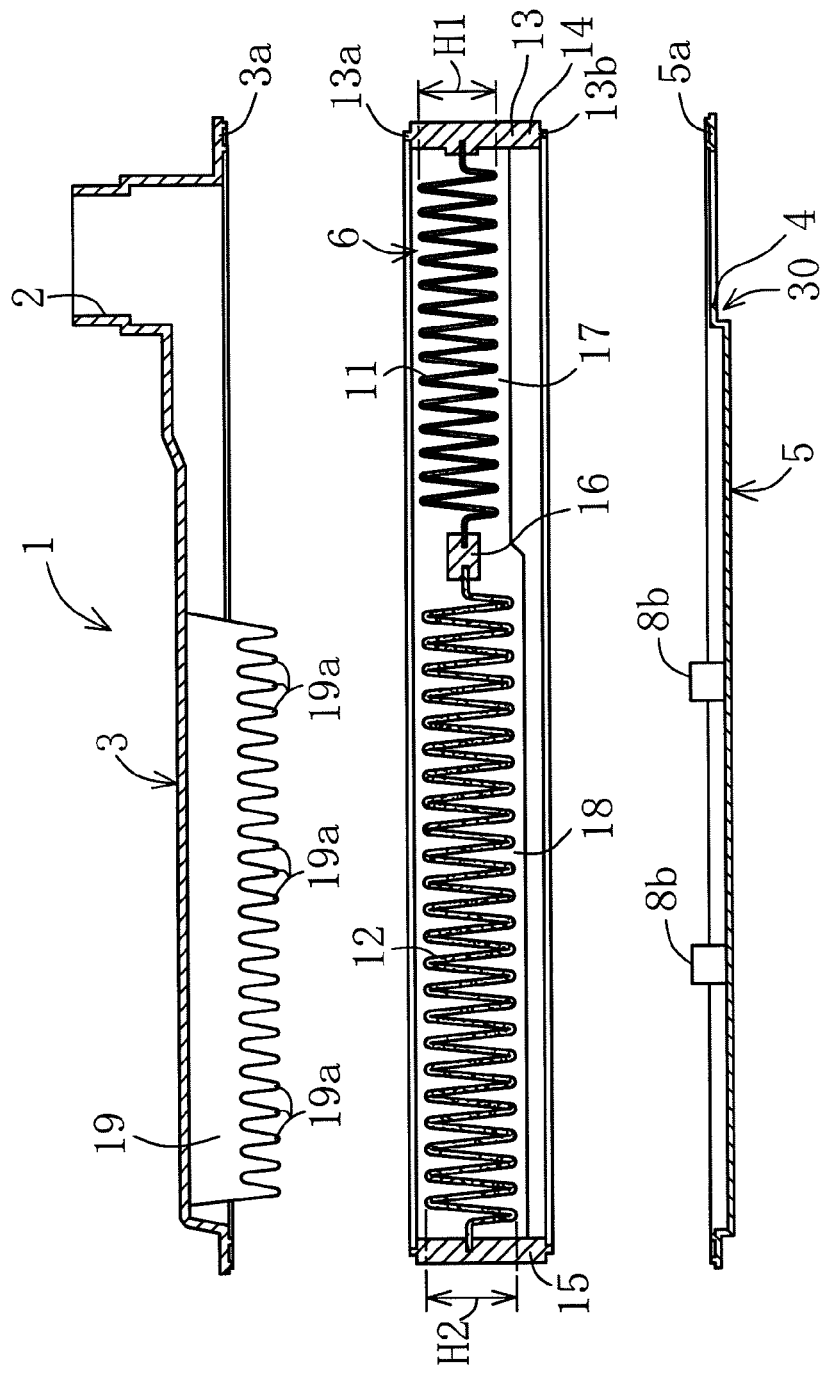
FIG. 4 is a vertical cross sectional view showing a exploded state of the oil filter for an automatic transmission.

The fluid filter according to the present embodiment 1 may include, for example, a configuration in which the fold height (H1) of the first filter material (11) is smaller than the fold height (H2) of the second filter material (12) (for example, see FIG. 4). In this case, for example, the ratio (H2/H1) between the fold height (H1) of the first filter material and the fold height (H2) of the second filter material may range from 1.1 to 1.5 (especially, from 1.1 to 1.3). Thus, it is possible to more efficiently suppress the fold contact in the first filter material and to more efficiently ensure the filtration area necessary for the first and second filter materials.

Figure 2:
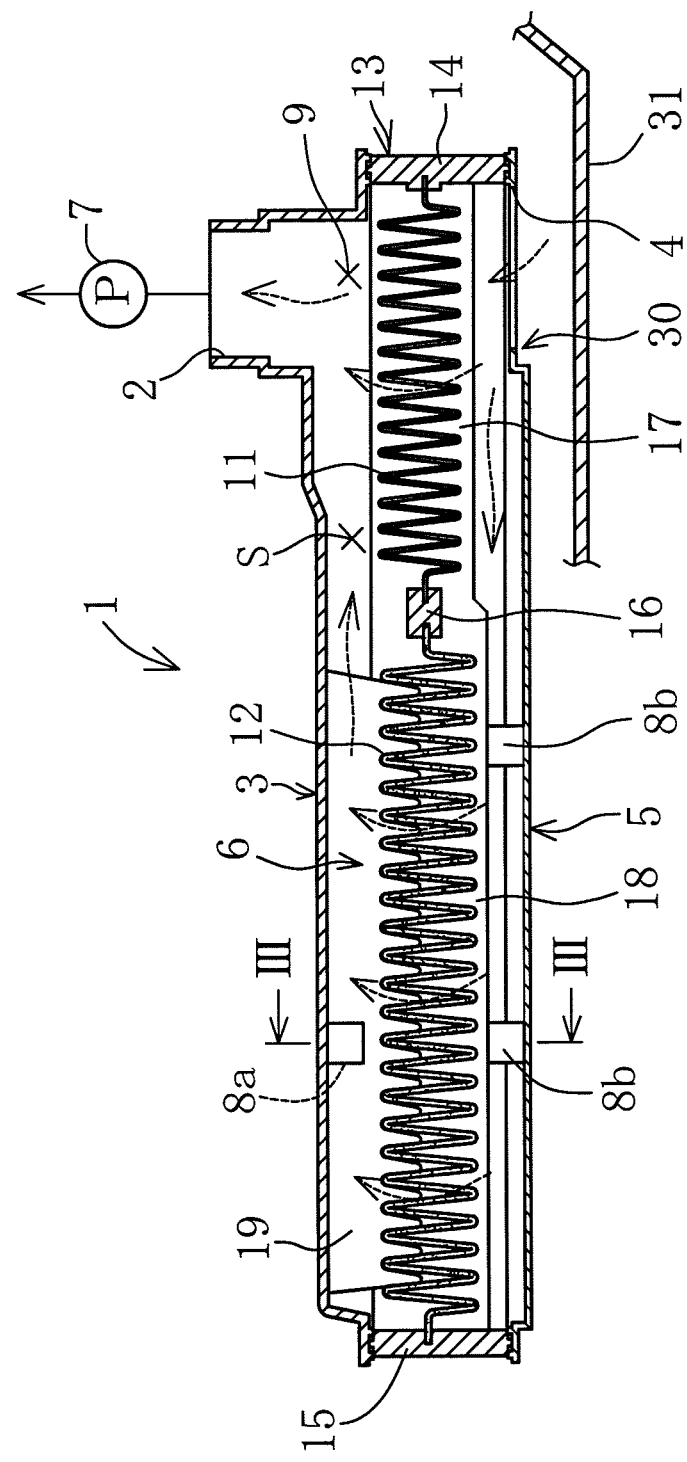
FIG. 2 is a cross sectional view taken along line II-II shown in FIG. 1.

In the above configuration, for example, at the bottom of the lower case (5), a step part (30) formed with the inlet hole (4) may be formed such that the bottom is raised and dented upward (for example, see FIG. 2). Thus, it is possible to ensure the fluid flow interval necessary between the first filter material and the inlet hole while ensuring smooth inlet of the fluid from the inlet hole to prevent an increase in pressure loss.

The fluid filter of the present embodiment 1 may include, for example, a configuration in which a reinforcing member (19) having an insertion part (19a) to be inserted between the neighboring folds (12a) of the second filter material is provided on the downstream side surface of the second filter material (12) (for example, FIG. 4).

Figure 7:
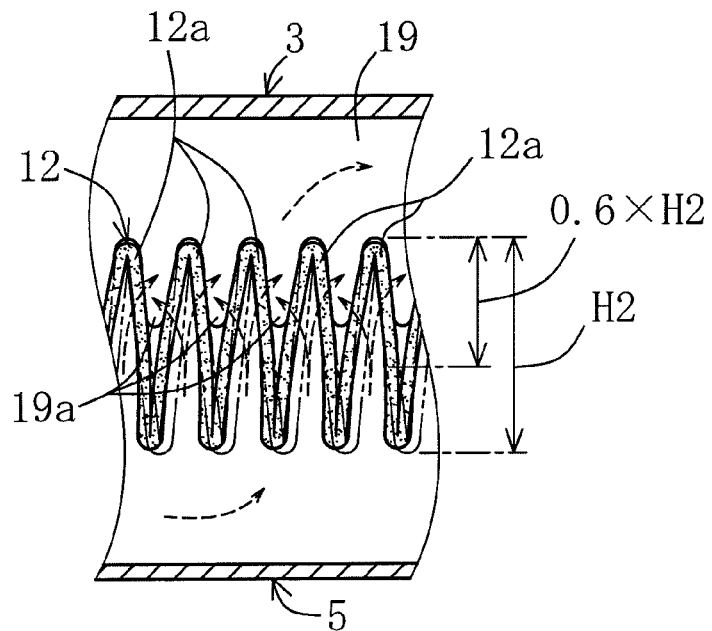
FIG. 7 is an enlarged view showing the main section shown in FIG. 2.

In the case of the above configuration, for example, the reinforcing member (19) may be provided such that the lower end of the insertion part (19a) is positioned above a position of 0.6 times (preferably, 0.55 times, especially, 0.5 times) of the fold height (H2) from the upper end of the fold (12a) to the lower side (for example, see FIG. 7). Thus, it is possible to decrease the contact area between the folds and the reinforcing member to more efficiently ensure the filtration area necessary for the second filter material. In the meantime, the reinforcing member is preferably provided such that the lower end of the insertion part is positioned below a position of 0.18 times (preferably, 0.25 times, especially, 0.32 times) of the fold height (H2) from the upper end of the fold (12a) to the lower side. This is intended to suitably prevent fold contact.

In the case of the above configuration, for example, the reinforcing member (19) may be provided as a separate part from the second filter material (12), and formed in a comb-like shape to be inserted from the upper side of the second filter material (for example, see FIG. 4). Thus, it is possible to simplify the structure of the second filter material and thus the filter element.

In the case of the above configuration, for example, the filter element (6) may be provided with a rib (18) extending in the direction crossing the fold line direction of the second filter material in substantially the central part in the fold line direction (P) of the second filter material (12). The reinforcing members (19) may be provided on both the sides of the rib in a position intermediate between the rib and the end part of the fold line direction of the second filter material (for example, see FIG. 5). Thus, the second filter material is supported, at a predetermined interval, by the reinforcing member and the rib in the fold line direction, and it is possible to more efficiently suppress the fold contact of the second filter material in the fold line direction.

Figure 3:
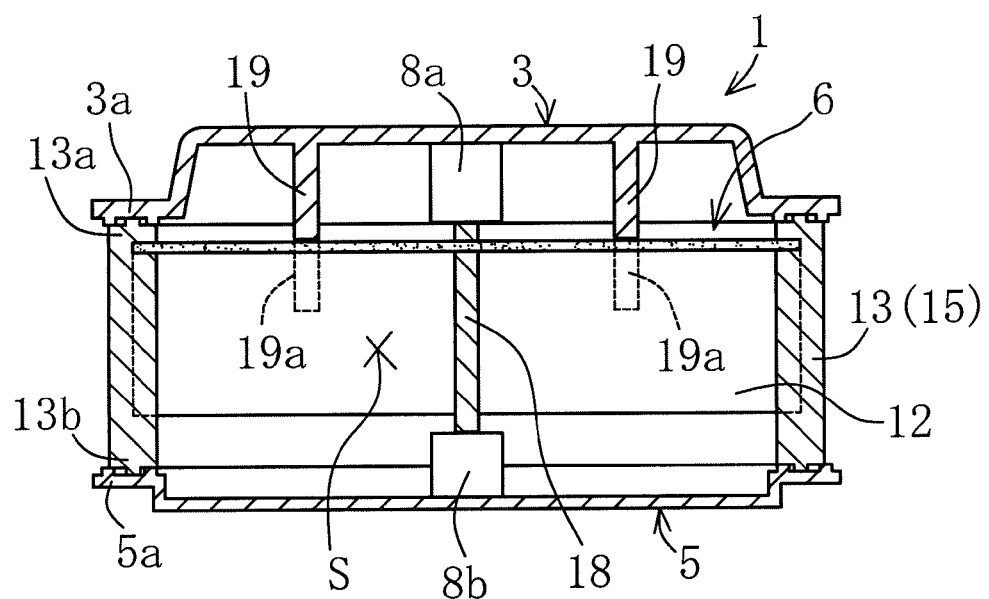
FIG. 3 is an enlarged cross sectional view taken along line shown in FIG. 2.

In the case of the above configuration, for example, convex part (8a, 8b) which abut the upper or lower end surface of the rib (18) when the case is deformed by a change in pressure during filtration may be formed in the upper case (3) and/or lower case (5) (for example, see FIG. 3). Thus, the convex part abuts the rib in the state where the internal pressure within the filtration chamber is lower than the external pressure during the use of the fluid filter, so that excessive deformation of the case can be suppressed to ensure the fluid flow path within the filtration chamber, thereby preventing an increase in pressure loss.

The fluid filter of the present embodiment 1 may include, for example, a configuration in which the fluid filter is an oil filter (1) for an automatic transmission (for example, see FIG. 2). This oil filter for an automatic transmission is normally arranged within an oil pan.

Figure 6:
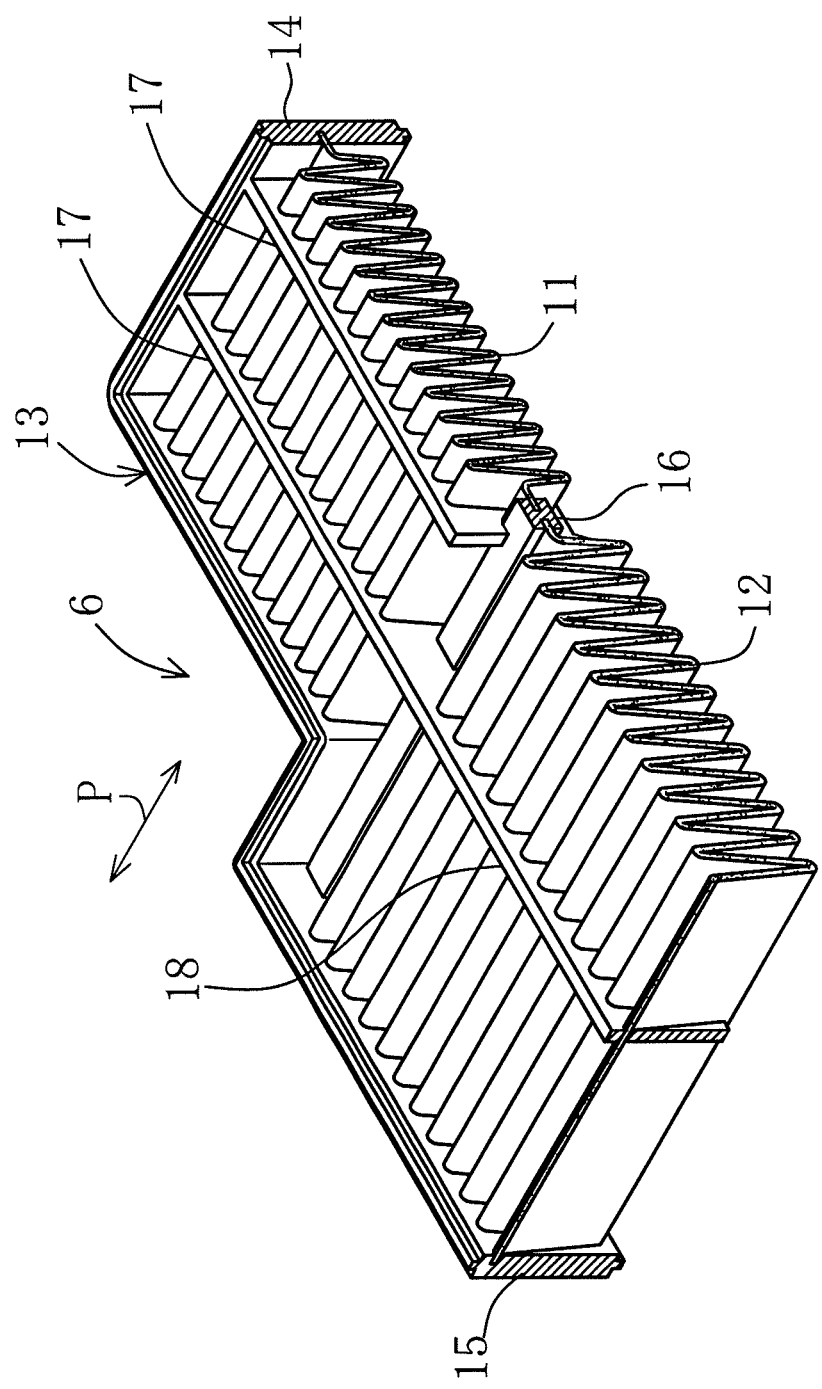
FIG. 6 is a perspective view showing the main section of the filter element.

The fluid filter of the present embodiment 1 may include, for example, a configuration in which the filter element (6) has a retention frame (13) retaining the circumferential parts of the first filter material (11) and second filter material (12) and held between the upper case (3) and the lower case (5), the first filter material (11) and second filter material (12) being arranged in parallel in a planar direction (for example, see FIGS. 5 and 6). Thus, it is possible to provide a filter element and thus a fluid filter excellent in assembly. In this case, for example, the retention frame and the first and second filter materials can be integrally molded, and thus it is possible to provide a filter element and thus a fluid filter excellent in productivity.

The above configuration may include, for example, one or a combination of two or more of [A], [B] below and the like.

[A] a configuration in which the retention frame (13) has one or two or more first rib(s) (17) extending in a direction crossing the fold line direction (P) of the first filter material (11), and the retention interval (L1) is an interval obtained by dividing the length in the fold line direction of the first filter material into a plurality of parts at substantially equal intervals by the first ribs (for example, see FIG. 5), and

[B] a configuration in which the retention frame (13) has one or two or more second ribs (18) extending in a direction crossing the fold line direction of the second filter material (12), and the retention interval (L2) is an interval obtained by dividing the length in the fold line direction of the second filter material into a plurality of parts at substantially equal intervals by the second ribs (for example, see FIG. 5).

These configurations may more efficiently suppress the fold contact in the filter material and more efficiently ensure the filtration area necessary for the filter material.

In the case of the above configurations, for example, the upper case (3) and lower case (5) are respectively joined to the retention frame (13) by welding to form the filtration chamber (S). A pump (7) which suctions a fluid to be filtered from the filtration chamber may be connected to the outlet hole (4) directly or via piping. At least one of the upper and lower cases may be provided with a convex wall part (23, 25) formed to be projected toward the filter element (6) side in a position apart, at a predetermined interval, from the joining part (20, 21) with the retention frame toward the inside direction of the filtration chamber. The convex wall parts may be provided so as to abut the retention frame when the upper and lower cases are deformed by a change in pressure during filtration (for example, see FIGS. 9 and 10). Due to this, during filtration in which the fluid flows within the filtration chamber, the convex wall parts abut the retention frame, so that spaces where weld burrs are housed between the joining parts and the convex wall parts are isolated from the filtration chamber, and that the weld burrs are prevented from invading into the filtration chamber. During welding between the cases and the retention frame, the convex wall parts do not abut the retention frame, and thus the weld penetration of the joining parts is not inhibited, so that the joining parts are welded in a determined weld amount (weld penetration amount). Therefore, the joining between the members by welding can be ensured. In the meantime, the "predetermined interval" is not especially limited, but is normally determined as an interval which can ensure a space sufficient to contain burr with consideration for the size of the burr generated during welding.

Figure 11:
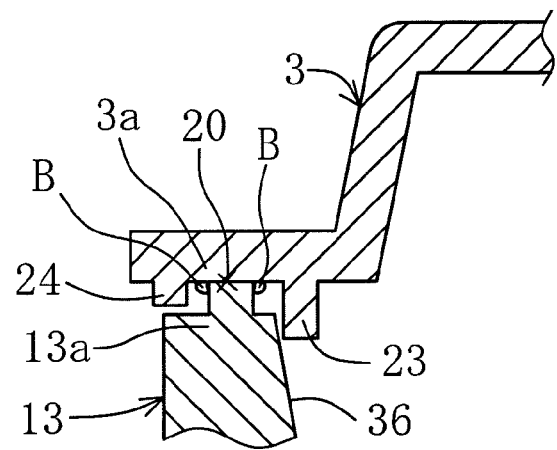
FIG. 11 is an explanatory view for explaining a convex wall part in another embodiment.
Figure 12:
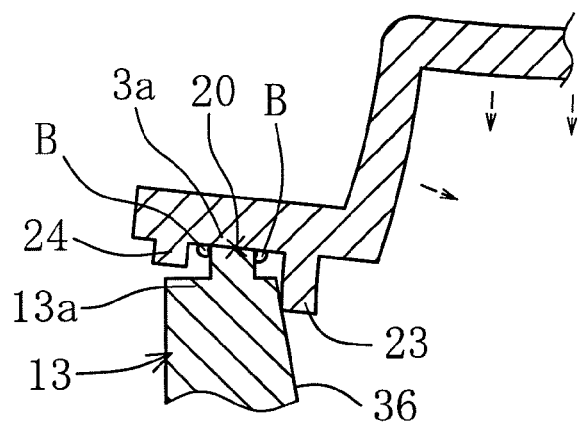
FIG. 12 is an explanatory view for explaining the operation of the convex wall part above.

In the case of the above configurations, for example, the abutment surface of the retention frame (13) abutting the convex wall part (23, 25) may be a wall formed to extend in the vertical direction and may be defined as an inclined surface (36) which is inclined such that a wall surface more widely apart from the joining part is directed toward the inside direction of the filtration chamber (S) (for example, see FIGS. 11 and 12). Due to this, the convex wall part and the retention frame are firmly pressed as the deformation of the case member progresses, and it is possible to more reliably prevent the invasion of the weld burrs into the filtration chamber.

In the case of the above configurations, for example, at least one of the upper case (3) and lower case (5) may be provided with an outer convex wall part (24, 26) formed to be projected toward the filter element (6) side in a position apart, at a predetermined interval, from the joining part (20, 21) with the retention frame (13) toward the outside direction of the filtration chamber (S) (for example, see FIGS. 9 to 12). Due to this, among the weld burrs generated in the joining part, the weld burrs generated outside the filtration chamber are covered with the outer convex wall part, and thus are not exposed on the outside, so that design can be enhanced.

The first and second filter materials in the fluid filter of the present invention may have any filtering properties and correlation therebetween. Namely, the first and second filter materials, when compared, may have the same filtering properties or may have different filtering properties. However, when the first and second filter materials have different filtering properties, the second filter material is preferably a filter material lower in pressure loss than the first filter material. Namely, as compared with the first filter material, the second filter material is preferably a filter material allowing the fluid to pass through easily, regardless of the configuration, material, thickness, etc. of the first and second filter materials.

Figure 13A:
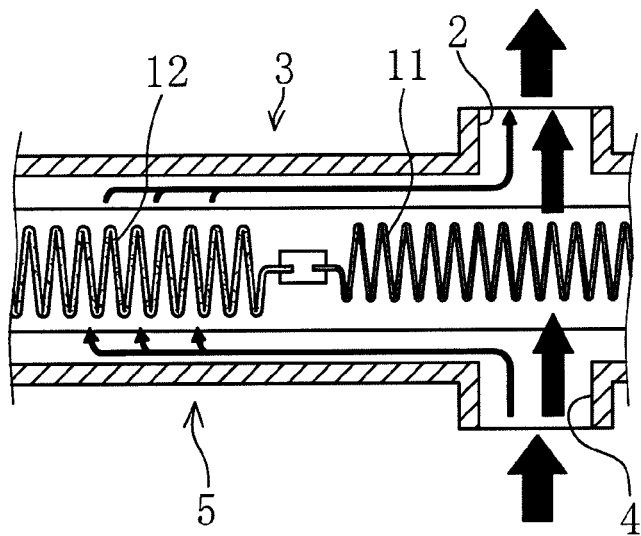
FIGS. 13A and 13B are explanatory views which explain the flows when a second filter material having a low pressure loss is used, in which 13A is in a state when the viscosity of the fluid is larger, and 13B is in a state when the viscosity of the fluid is smaller.
Figure 13B:
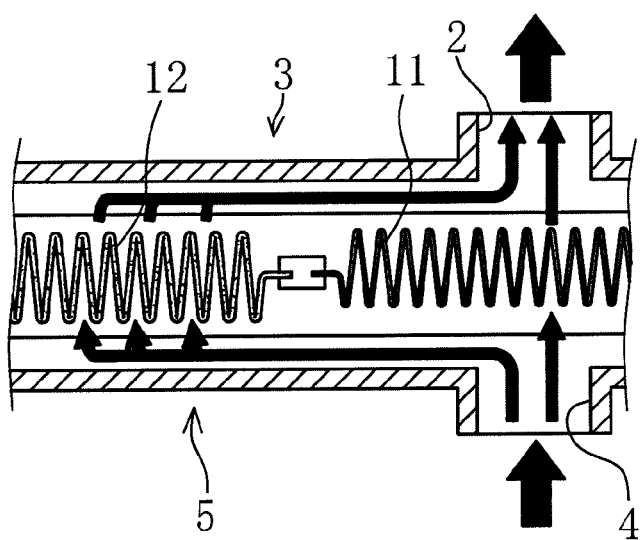
Figure 14A:
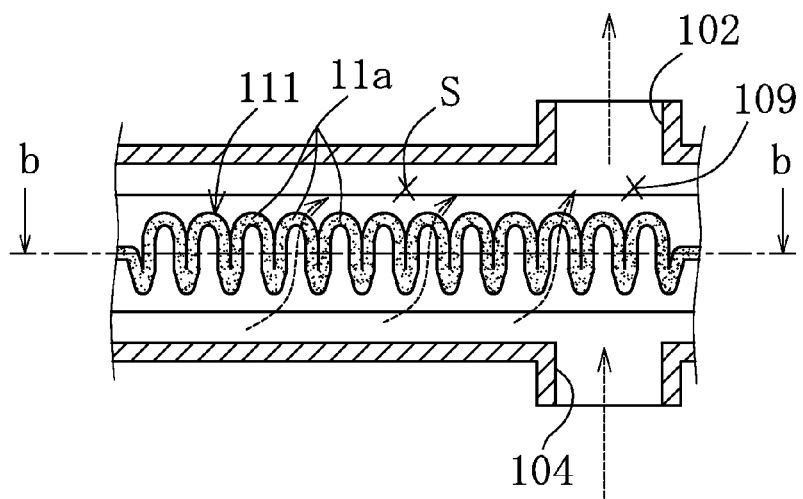
FIGS. 14A and 14B are explanatory views for explaining a conventional filter element, in which 14A is a vertical cross sectional view and 14B is a cross sectional view taken along line b-b shown in 14A.
Figure 14B:
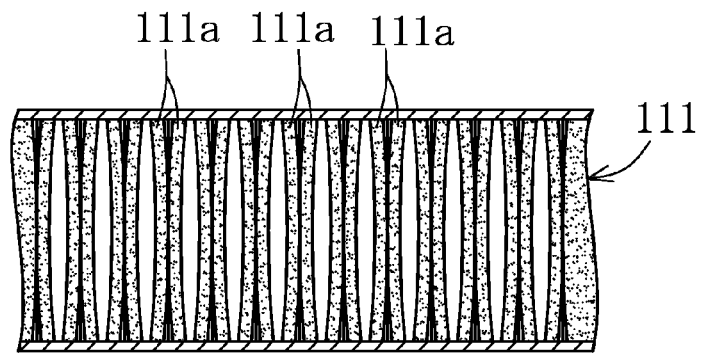

In a fluid filter that the second filter material is preferably a filter material lower in pressure loss than the first filter material, the filtration efficiency of the entire filter can be improved by varying the flow amount depending on a change in viscosity of the fluid. Specifically, for example, in the case where oil for a transmission is utilized as fluid, when the fluid has low viscosity and is able to pass through the first filter material, the fluid would be mainly filtered through the first filter material 11 arranged in a position close to the inlet hole 2 (see FIG. 13A in which a thicker arrow indicates a higher flow amount). However, when the viscosity of the fluid is higher at the time of actuation of the transmission, especially, at the time of actuation thereof at a low temperature, the fluid not filtered by the first filter material 11 is naturally diverted toward the second filter material 12 along the flow path so that the amount of the fluid filtered through the second filter material 12 would be increased (see FIG. 13B in which a thicker arrow indicates a higher flow amount). The second filter material 12 has lower pressure loss than the first filter material 11, and thus has a higher filtering speed than the first filter material 11, and as a result, can improve the filtration efficiency of the entire filter. Specifically, the filter, as a whole, can suppress the pressure loss when the viscosity of the fluid is high. Especially, the present fluid filter is designed such that the retention interval L2 of the second filter material 12 is greater than the retention interval L1 of the first filter material 11, thereby easily ensuring the filtration area in the second filter material 12. Due to this, when the filtration area of the second filter material 12 is greater than that of the first filter material 11, the second filter material 12 can be especially effectively utilized.

The constructions of the first and second filter materials are not especially limited, but normally, can employ a filter paper, a nonwoven fabric or a woven fabric or the like. These materials may be used singly or as a combination of two or more thereof. Among these materials, a filter paper is preferably used in the fluid filter of the present invention. The filter paper is a material obtained by papermaking a filter paper material (fibrous material) constituting the filter paper. The example of the filter paper material constituting the filter paper may include cellulose fibers (such as pulp fibers, linter fibers and rayon fibers), polyethylene terephthalate (PET) fibers, acrylic fibers; polyvinyl alcohol fibers, polyamide-based synthetic fibers and the like. These materials may be used singly or as a combination of two or more thereof. Among these materials, a material having a melting point or decomposition temperature of 170° C. or higher (preferably, 180° C. to 300° C.) is preferably used. Specifically, cellulose fibers, PET fibers and polyamide fibers are preferably used.

The filter paper may be either a single-layer filter paper or a multi-layer filter paper. Further, the filter paper may be a resinated filter paper. The multi-layer filter paper, for example, may include filter papers obtained by laminating two or more layers of filter papers having different properties and filter papers including a reinforcing layer. Among these, the filter paper including a reinforcing layer may include filter papers on which a resin fiber net is laminated. In the filter paper on which a resin fiber net is laminated, the strength and shape retainability are improved by the resin fiber net. Especially, when a filter paper includes a layer composed of a resin fiber net (resin fiber net layer), the resin fiber net is preferably arranged on the downstream side surface of the filter material. This arrangement can improve the strength and shape retainability without inhibiting the flow of the fluid.

More specifically, first and second filter materials satisfying the relation $(B_1/T_1)>(B_2/T_2)$ when the basis weight of the first filter material is defined as $B_1$ (g/m²) and the thickness thereof is defined as $T_1$ (m), and the basis weight of the second filter material is defined as $B_2$ (g/m²) and the thickness thereof is defined as $T_2$ (m), are preferably used. In the meantime, the basis weight and thickness values are measured in accordance with JIS P8124 and JIS P8118, respectively.

Examples

Hereinafter, the present invention will be explained in detail by way of an Example. In the present Example, an oil filter for use in an automatic transmission is exemplified as the "fluid filter" according to the present invention.

(1) Oil Filter for Automatic Transmission
An oil filter 1 for an automatic transmission according to the present Example includes an upper case 3 having a concave vertical cross sectional shape and provided with an outlet hole 2, a lower case 5 having a concave vertical cross sectional shape and provided with an inlet hole 4, and a filter element 6 held between the upper and lower cases 3, 5, as shown in FIGS. 1 to 3. A filtration chamber S is formed by holding the filter element 6 held between the upper and lower cases 3, 5.

The outlet hole 2 and inlet hole 4 are arranged opposite to each other in the vertical direction via the filter element 6. Specifically, the outlet hole 2 and inlet hole 4 are arranged such that their flow axial directions are aligned on one straight line. An oil pump 7 suctioning fluid to be filtered from the filtration chamber S is connected, by piping, to the outlet hole 2 (see FIG. 2).

The upper case 3 is made of a laser-permeable resin. On the lower surface side of the outer circumferential part of the upper case 3, a concave edge part 3a having a concave vertical cross sectional shape for joining with a retention frame described below is formed over the whole circumference, as shown in FIG. 3. A convex part 8a abutting the upper end surface of a second rib described below when the upper case 3 is deformed by a change in pressure during filtration is formed in the upper case 3.

The lower case 5 is made of a laser-permeable resin. On the upper surface side of the outer circumferential part of this lower case 5, a concave edge part 5a having a concave vertical cross sectional shape for joining with a retention frame described below is formed over the whole circumference, as shown in FIG. 3. A convex part 8b abutting the lower end surface of a second rib described below when the lower case 5 is deformed by a change in pressure during filtration is formed in the lower case 5. Further, at the bottom of the lower case 5, a step part 30 formed with the inlet hole 4 is formed such that the bottom is raised and dented upward (see FIG. 2)

As shown in FIGS. 4 to 6, the filter element 6 includes a first filter material 11 and a second filter material 12 that are arranged in parallel to each other in a planar direction, folded and made of a nonwoven fabric, and a retention frame 13 retaining the circumferential parts of these first and second filter materials 11, 12 and held between the upper and lower cases 3, 5. Each of these first and second filter materials 11, 12 is formed in a substantially rectangular shape in a plane. The first filter material 11 is arranged in the communication part 9 connecting the outlet hole 2 and the inlet hole 4, and the second filter material 12 is spaced apart from the communication part 9 (see FIG. 2). In the meantime, the retention frame 13 and the first and second filter materials 11, 12 are integrally insert-molded.

The retention frame 13 is made of a laser-absorbing resin. As shown in FIGS. 5 and 6, the retention frame 13 includes a first retaining part 14 with a substantially U shape in a plane, which retains both the end sides in the fold line direction P of the first filter material 11 and one end side in a direction substantially orthogonal to the fold line direction P of the first filter material 11, a second retaining part 15 with a substantially U shape in a plane, which retains both the end sides in the fold line direction P of the second filter material 12 and one end side in a direction substantially orthogonal to the fold line direction P of the second filter material 12, and an elongated third retaining part 16 retaining the other end side in the direction substantially orthogonal to the fold line direction P of the first and second filter materials 11 and 12, respectively.

The retention frame 13 includes a plurality (two in the drawings) of first ribs 17 extending in the direction substantially orthogonal to the fold line direction P of the first filter material 11 and bridged between the first retaining part 14 and the third retaining part 16, and a single second rib 18 extending in the direction substantially orthogonal to the fold line direction P of the second filter material 12 and bridged between the second retaining part 15 and the third retaining part 16.

The respective first ribs 17 are arranged in a position obtained by dividing the length in the fold line direction of the first filter material 11 almost equally into three parts. The second rib 18 is arranged in a position obtained by dividing the length in the fold line direction P of the second filter material 12 almost equally into two parts. Further, one end side, in the longitudinal direction, of the second rib 18 connects to one end side, in the longitudinal direction, of one of the first ribs 17.

As shown in FIG. 5, the retention interval L1 in the fold line direction P of the first filter material 11 is an interval obtained by dividing the length in the fold line direction P of the first filter material 11 into a plurality of parts (three parts in FIG. 5) at substantially equal intervals by the first ribs 17, and is defined as about 13 mm. The retention interval L2 in the fold line direction P of the second filter material 12 is an interval obtained by dividing the length in the fold line direction P of the second filter material 12 into a plurality of parts (two parts in FIG. 5) at substantially equal intervals by the second rib 18, and is defined as about 26 mm. Thus, the retention interval L1 is defined as being smaller than the retention interval L2, and the ratio between the retention intervals L1 and L2 (L2/L1) is defined as about 2.

As shown in FIG. 4, the fold height H1 of the first filter material 11 is defined as about 12 mm, and the fold height H2 of the second filter material 12 is defined as about 14 mm. Thus, the fold height H1 of the first filter material 11 is defined as being smaller than the fold height H2 of the second filter material 12, and the ratio between the fold heights H1 and H2 (H2/H1) is defined as about 1.2. Further, the first and second filter materials 11, 12 are arranged such that their upper end surfaces are substantially in one plane.

In the upper case 3, a plurality (two in the drawings) of plate-like reinforcing members 19 (also referred to as "separators") are formed in a direction substantially orthogonal to the fold line direction P of the second filter material 12, as shown in FIGS. 1 to 3. These respective reinforcing members 19 are provided in positions on both the sides of the second rib 18 in the fold line direction P of the second filter material 12, obtained by dividing the interval between the second rib 18 and the end part in the fold line direction P of the second filter material 12 (namely, retention interval L2) almost equally into two parts. The respective reinforcing members 19 have a plurality of insertion parts 19a to be inserted between the neighboring folds 12a on the downstream side surface of the second filter material 12, and are formed in a comb-like shape, as shown in FIG. 4. Further, the respective reinforcing members 19 are provided such that the lower ends of the respective insertion parts 19a are positioned above the position which is 0.6 times higher than the fold height H2 of the second filter material 12 from the upper ends of the folds 12a toward the lower side, as shown in FIG. 7.

A convex edge part 13a having a convex vertical cross sectional shape, which is engaged with the concave edge part 3a of the upper case 3, is formed over the whole circumference, as shown in FIG. 3, on the upper surface side of the outer circumferential part of the retention frame 13. A joining part 20 by laser welding is formed between these concave edge part 3a and convex edge part 13a (see FIG. 9). A convex edge part 13b having a convex vertical cross sectional shape, which is engaged with the concave edge part 5a of the lower case 5, is formed over the whole circumference on the lower surface side of the outer circumferential part of the retention frame 13. A joining part 21 by laser welding is formed between these concave edge part 5a and the convex edge part 13b (see FIG. 9).

Figure 9:
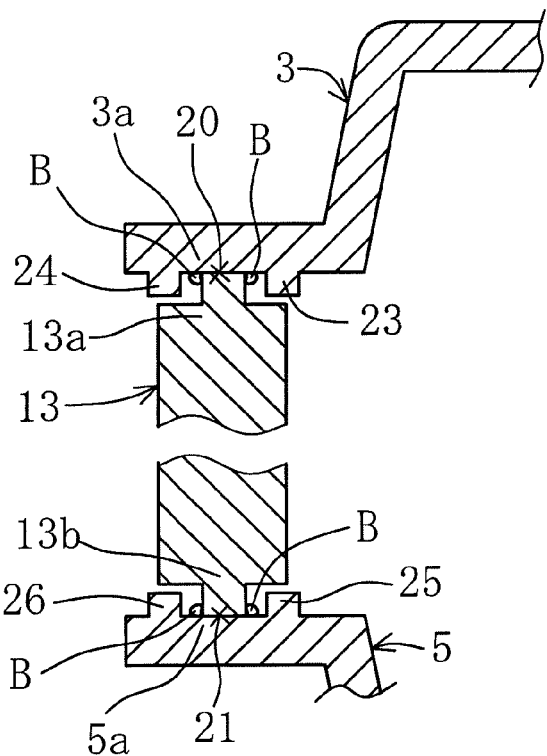
FIG. 9 is an enlarged view showing the main section shown in FIG. 3.
Figure 10:
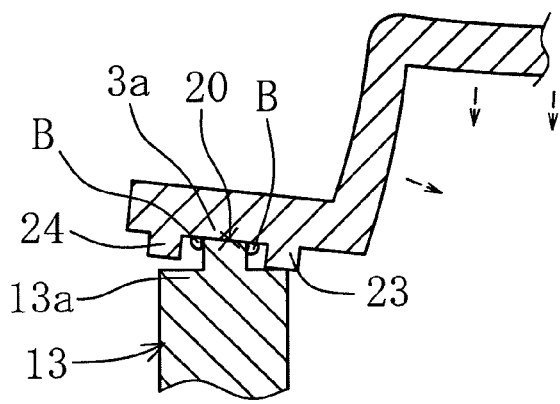
FIG. 10 is an explanatory view for explaining the operation of a convex wall part according to an Example.

The concave edge part 3a of the upper case 3 has a convex wall part 23 provided in a position apart, at a predetermined interval, from the joining part 20 with the retention frame 13 toward the inside direction of the filtration chamber S and formed to be projected to the filter element 6 and an outer convex wall part 24 provided in a position apart, at a predetermined interval, from the joining part 20 with the retention frame 13 toward the outside direction of the filtration chamber S and formed to be projected to the filter element 6, as shown in FIG. 9. The convex wall part 23 is provided to abut the retention frame 13 when the upper case 3 is deformed by a change in pressure during filtration, as shown in FIG. 10.

The concave edge part 5a of the lower case 5 has a convex wall part 25 provided in a position apart, at a predetermined interval, from the joining part 21 with the retention frame 13 toward the inside direction of the filtration chamber S and formed to be projected to the filter element 6 and an outer convex wall part 26 provided in a position apart, at a predetermined interval, from the joining part 21 with the retention frame 13 toward the outside direction of the filtration chamber S and formed to be projected to the filter element 6, as shown in FIG. 9. The convex wall part 25 is provided to abut the retention frame 13 when the lower case 5 is deformed by a change in pressure during filtration.

(2) Operation of Oil Filter for Automatic Transmission

Next, the action of the oil filter 1 for an automatic transmission will be explained. The filter 1 for an automatic transmission is used while the oil pump 7 is actuated in the state where it is immersed in oil within an oil pan 31, as shown in FIG. 2. The oil used on the automatic transmission side is stored within the oil pan 31, and the stored oil is flowed into the filtration chamber S from the inlet hole 4. A relatively high-pressure oil flowing in the communication part 9 and its vicinity within the filtration chamber S is mainly filtered through the first filter material 11, and a relatively low-pressure oil flowing in a site spaced apart from the communication part 9 within the filtration chamber S is mainly filtered through the second filter material 12. The filtered oil is flowed out from the outlet hole 2 and returned back to the automatic transmission side.

When the oil is filtered through the second filter material 12, the second filter material 12 is deformed when the oil passes through the second filter material 12, as shown in FIG. 7. However, since the respective insertion parts 19a of the reinforcing member 19 are inserted between the neighboring folds 12a of the second filter material 12, fold contact is suppressed. The deformation of the upper and lower cases 3, 5 due to suction pressure of the oil pump 7 is suppressed by abutment of the convex parts 8a, 8b (see FIG. 3) with the second rib 18.

In the case where the oil pump 7 is not actuated, the deformation of the upper and lower cases 3, 5 does not occur, and the convex wall parts 23, 25 do not abut the retention frame 13 (see FIG. 9). On the other hand, in the case where the oil pump 7 is actuated, the internal pressure within the filtration chamber S decreases, and the upper and lower cases 3, 5 are deformed in the inside direction of the filtration chamber S due to this change in pressure (see FIG. 10). Due to this, the convex wall parts 23, 25 abut the retention frame 13, so that a space where a weld burr B is housed is isolated from the filtration chamber S.

(3) Effect of Example

In view of the above, according to the oil filter 1 for an automatic transmission of the Example, the filter element 6 includes a first filter material 11 which is folded and arranged in a communication part 9 connecting an outlet hole 2 and an inlet hole 4 and a second filter material 12 which is folded and spaced apart from the communication part 9, and the retention interval L1 in the fold line direction P of the first filter material 11 is smaller than the retention interval L2 in the fold line direction P of the second filter material 12. Thus, the first filter material 11 filtering mainly the oil flowing in the communication part 9 within the filtration chamber S is retained at a high retention force as compared with the second filter material 12 filtering mainly the oil flowing in a site spaced apart from the communication part 9 within the filtration chamber S. Thus, it is possible to suppress fold contact in the first filter material 11 on the high retention side to prevent an increase in pressure loss, thereby enhancing the lifetime, namely, dust retaining amount of the filter material. Further, the filtration area necessary for the second filter material 12 on the low retention side in addition to the first filter material 11 on the high retention side can be easily ensured, thereby improving the filtration efficiency.

In this Example, the fold height H1 of the first filter material 11 is smaller than the fold height H2 of the second filter material 12, and thus it is possible to more efficiently suppress the fold contact in the first filter material 11 on the high retention side and to more efficiently ensure the filtration area necessary for the second filter material 12 on the low retention side.

In this Example, at the bottom of the lower case 5, a step part 30 formed with the inlet hole 4 is formed such that the bottom is raised and dented upward. Thus, it is possible to ensure the oil flow interval necessary between the first filter material 11 and the inlet hole 4 while ensuring smooth inflow of the oil from the inlet hole 4 to prevent an increase in pressure loss.

In this Example, a reinforcing member 19 is provided on the downstream side surface of the second filter material 12, and thus an insertion part 19a of the reinforcing member 19 is inserted between the neighboring folds 12a of the second filter material 12, so that the fold contact of the second filter material 12 on the low retention side is suppressed.

In this Example, the reinforcing member 19 is provided such that the lower end of the insertion part 19a is positioned 0.6 times above the position of the fold height H2 from the upper end of the fold 12a to the lower side. Thus, it is possible to decrease the contact area between the folds 12a and the reinforcing member 19 to more efficiently ensure the filtration area necessary for the second filter material 12.

In this Example, the reinforcing member 19 is provided as a separate part from the second filter material 12, and formed in a comb-like shape to be inserted from the upper part of the second filter material 12. Thus, it is possible to simplify the structure of the second filter material 12 and thus the filter element 6.

In this Example, the filter element 6 is provided with a second rib 18 extending in a direction crossing the fold line direction P of the second filter material 12 in substantially the central part in the fold line direction P of the folds thereof. The reinforcing member 19 is provided on both the sides of the second rib 18 in a position intermediate between the second rib 18 and the end part of the fold line direction P of the ribs of the second filter material 12. Thus, the second filter material 12 is supported, at a predetermined interval, by the reinforcing member 19 and the second rib 18 in the fold line direction P of the folds, and it is possible to more efficiently suppress the fold contact of the second filter material 12 in the fold line direction P of the folds.

In this Example, convex parts 8a, 8b which abut the upper or lower end surface of the second rib 18 when the cases 3, 5 are deformed by a change in pressure during filtration are formed in the upper case 3 and lower case 5. Thus, the convex parts 8a, 8b abut the second rib 18 in the state where the internal pressure within the filtration chamber S is lower than the external pressure during the use of the oil filter 1 for an automatic transmission, so that excessive deformation of the upper case 3 and lower case 5 can be suppressed to ensure the oil flow path within the filtration chamber S, thereby preventing an increase in pressure loss.

In this Example, the filter element 6 has a retention frame 13 retaining the circumferential parts of the first filter material 11 and second filter material 12 arranged in parallel in a planar direction and held between the upper case 3 and the lower case 5. Thus, it is possible to provide a filter element 6 and thus an oil filter 1 for an automatic transmission excellent in assembly. Especially, in this Example, the retention frame 13 and the first and second filter materials 11, 12 are integrally molded, and thus it is possible to provide a filter element 6 and thus an oil filter 1 for an automatic transmission excellent in productivity.

In this Example, the retention frame 13 has a first rib 17 extending in a direction substantially orthogonal to the fold line direction P of the first filter material 11, and the retention interval L1 is an interval obtained by dividing the length of the fold line direction P of the first filter material 11 into a plurality of parts at substantially equal intervals by the first rib 17, so that it is possible to more efficiently suppress the fold contact in the first filter material 11 and to more efficiently ensure the filtration area necessary for the first filter material 11.

In this Example, the retention frame 13 has a second rib 18 extending in a direction substantially orthogonal to the fold line direction P of the second filter material 12, and the retention interval L2 is an interval obtained by dividing the length of the fold line direction P of the second filter material 12 into a plurality of parts at substantially equal intervals by the second rib 18, so that it is possible to more efficiently suppress the fold contact in the second filter material 12 and to more efficiently ensure the filtration area necessary for the second filter material 12.

In this Example, the upper case 3 and lower case 5 are respectively joined to the retention frame 13 by welding to form the filtration chamber S. An oil pump 7 which suctions oil to be filtered from the filtration chamber S is connected to the outlet hole 2 via piping, and the upper and lower cases 3, 5 are respectively provided with convex wall parts 23, 25 formed to be projected toward the filter element 6 side in a position apart, at a predetermined interval, from the joining parts 20, 21 with the retention frame 13 toward the inside direction of the filtration chamber S. The convex wall parts 23, 25 are provided so as to abut the retention frame 13 when the upper and lower cases 3, 5 are deformed by a change in pressure during filtration. Due to this, during filtration in which the oil flows within the filtration chamber S, the convex wall parts 23, 25 abut the retention frame 13, so that spaces where weld burrs B are housed between the joining parts 20, 21 and the convex wall parts 23, 25 are isolated from the filtration chamber S, and that the weld burrs B are prevented from invading into the filtration chamber S. During welding between the cases 3, 5 and the retention frame 13, the convex wall parts 23, 25 do not abut the retention frame 13, and thus the weld penetration of the joining parts 20, 21 is not inhibited, so that the joining parts 20, 21 are welded in a determined weld amount (weld penetration amount). Therefore, the joining between members by welding can be ensured.

In this Example, the upper case 3 and lower case 5 are respectively provided with outer convex wall parts 24, 26 formed to be projected toward the filter element 6 side in a position apart, at a predetermined interval, from the joining parts 20, 21 with the retention frame 13 toward the outside direction of the filtration chamber S. Due to this, among the weld burrs B generated in the joining parts 20, 21 during welding, the weld burrs B generated outside the filtration chamber S are covered with the outer convex wall parts, and thus are not exposed on the outside, so that design can be enhanced.

While the present invention is not limited to the above Example, and can be carried out as Examples variously modified within the scope of the present invention depending on the object and intended use. Specifically, while the above Example has illustrated the configuration in which the second filter material 12 is arranged in parallel on one end side of the first filter material 11, the present invention is not limited to the configuration, and, for example, may employ a configuration in which the second filter material 12 is arranged in parallel on both the ends of the first filter material 11 or a configuration in which the second filter material 12 is arranged in parallel to enclose the periphery of the first filter material 11.

While the above Example has illustrated the configuration in which the fold height H1 of the first filter material 11 is smaller than the fold height H2 of the second filter material 12, the present invention is not limited to the configuration, and, for example, may employ a configuration in which the fold height H1 of the first filter material 11 is substantially equal to the fold height H2 of the second filter material 12 or a configuration in which the fold height H1 of the first filter material 11 is greater than the fold height H2 of the second filter material 12.

While the above Example has illustrated the configuration in which the filter element 6 includes a retention frame 13 and filter materials 11, 12, the present invention is not limited to the configuration, and, for example, may employ a configuration in which the filter element includes filter materials alone. In this case, the circumferential edge sides of the filter materials are directly held between the upper and lower cases 3, 5.

While the above Example has illustrated a single retention frame 13 retaining the first and second filter materials 11, 12, the present invention is not limited to the configuration, and, for example, a first retention frame retaining the first filter material 11 and a second retention frame retaining the second filter material 12 may be provided separately.

In the above Example, the forms, numbers, presence or absence of use etc. of the ribs 17, 18 may be appropriately selected depending on the size of the filter materials, for example. Further, the above Example has illustrated the configuration in which ribs 17, 18 are integrally molded to the retention frame 13, the present invention is not limited to the configuration, and, for example, may employ a configuration in which ribs 17, 18 are assembled later to the retention frame 13.

While the above Example has illustrated the reinforcing member 19 suppressing the fold contact of the second filter material 12, the present invention is not limited to the configuration, and, for example, may employ a configuration in which a reinforcing member suppressing the fold contact of the first filter material 11 is provided in addition to or in place of the reinforcing member 19 suppressing the fold contact of the second filter material 12. Further, while the above Example has illustrated the reinforcing member 19 provided on the downstream surface side of the filter material 12, the present invention is not limited to the configuration, and, for example, may employ a configuration in which a reinforcing member is provided on the upstream surface side of the filter material 12 in addition to or in place of the reinforcing member 19 provided on the downstream surface side of the filter material 12.

While the above Example has illustrated the configuration in which the reinforcing member 19 provided as a separate part from the filter material 12 is inserted from the upper part of the filter material 12, the present invention is not limited to the configuration, and, for example, may employ a configuration in which the reinforcing member 19 is integrally formed with the retention frame 13 by insert-molding or the like. Further, while the above Example has illustrated the reinforcing member 19 provided integrally with the cases 3, 5, the present invention is not limited to the configuration, and, for example, may employ a configuration in which the reinforcing member 19 is assembled later to the retention frame 13 or the cases 3, 5.

Figure 8:
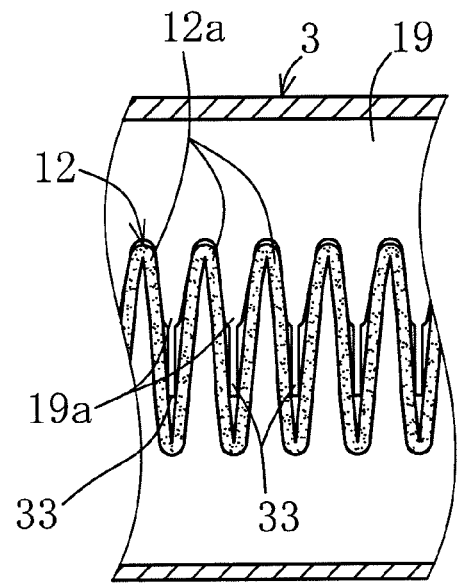
FIG. 8 is an explanatory view for explaining a modified example of a reinforcing member according to an Example.

In the reinforcing member 19 in the above Example, for example, a bar-like part 33 extending from the lower end of the reinforcing member 19 further downward may be provided, as shown in FIG. 8. This bar-like part 33 is provided, so that the deformation of the filter material 12 can be further suppressed and the filtration area can be ensured.

While the above Example has illustrated the configuration in which the abutment surface of the retention frame 13 abutting the convex wall parts 23, 25 is defined as an upper end surface of the retention frame 13, the present invention is not limited to the configuration, and, for example, may employ a configuration in which the abutment surface of the retention frame 13 abutting the convex wall parts 23, 25 is defined as inclined surface 36 which is formed to extend in the vertical direction and is inclined such that a wall surface more widely apart from the joining parts 20, 21 is directed toward the inside direction of the filtration chamber S, as shown in FIGS. 11 and 12. Due to this, the convex wall parts 23, 25 and the retention frame 13 are firmly pressed as the deformation of the cases 3, 5 member progresses, and it is possible to more reliably prevent the invasion of the weld burrs B into the filtration chamber S.

The material for the first and second filter materials 11, 12 can include, for example, a nonwoven fabric, a woven fabric, a filter paper and the like. Especially in the case where the filter paper is used, when a filter paper having $(B_1/T_1) > (B_2/T_2)$ is used as the first filter material 11, it is, in particular, to prevent flow bias of the filtered fluid within this fluid filter to improve the filtration efficiency of the entire filter.

Further, the planar shapes, sizes, numbers, etc. of the first and second filter materials 11, 12 can be appropriately selected depending, for example, on the fluid to be filtered. Further, while the above Example has illustrated laser welding as a joining configuration between the cases 3, 5 and the retention frame 13, the present invention is not limited to this, and they may be joined, for example, by vibration welding, ultrasonic welding, hot plate welding and adhesion with an adhesive.

Further, while the above Example has illustrated an oil filter 1 for use in an automatic transmission as the fluid filter according to the present invention, the present invention is not limited to this, and, for example, is applicable to entire fluid filters used in the state where the pressure within the filtration chamber is lower than the external pressure, such as an air filter provided in an intake system of an internal combustion engine.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above-described embodiments, and various variations and modifications may be possible without departing from the scope of the present invention.

The present invention is widely utilized as a fluid filtering technique. Especially, the fluid filter according to the present invention is suitably utilized as a fluid filter for an automatic transmission of vehicles including passenger cars, buses and trucks, as well as railway vehicles including railroad trains and diesel trains, construction vehicles, agricultural vehicles and industrial vehicles.

What is claimed is:

1. A fluid filter comprising:
an upper case provided with an outlet hole;
a lower case provided with an inlet hole; and
a filter element held between the upper case and lower case,
wherein the outlet hole and the inlet hole are arranged opposite to each other,
wherein the filter element comprises a first filter material which is folded and arranged in a communication part connecting the outlet hole and the inlet hole, and a second filter material which is folded and spaced apart from the communication part, and
wherein a retention interval of the first filter material in a fold line direction is smaller than a retention interval of the second filter material in the fold line direction.

2. The fluid filter according to claim 1, wherein a fold height of the first filter material is smaller than a fold height of the second filter material.

3. The fluid filter according to claim 1, wherein a reinforcing member having an insertion part to be inserted between neighboring folds of the second filter material is provided on a downstream side surface of the second filter material.

4. The fluid filter according to claim 1, wherein pressure loss in the second filter material is lower than pressure loss in the first filter material when fluid flows through the fluid filter.

5. The fluid filter according to claim 1, wherein the fluid filter is an oil filter for an automatic transmission.

6. The fluid filter according to claim 1, wherein second filter material is spaced apart from the first filter material in a fluid flow direction.

7. The fluid filter according to claim 1, wherein a ratio between the retention interval of the first filter material in the fold line direction and the retention interval of the second filter material in the fold line direction is 1.5 to 2.5.

8. The fluid filter according to claim 2, wherein a ratio between the fold height of the first filter material and the fold height of the second filter material is 1.1 to 1.5.

9. The fluid filter according to claim 1, wherein a step part defined with the inlet hole is provided at the bottom of the lower case such that the bottom is raised and dented upward.

10. The fluid filter according to claim 1, wherein the filter element comprises a retention frame retaining circumferential parts of the first filter material and the second filter material and held between the upper case and the lower case, and the first filter material and the second filter material being arranged in parallel in a planar direction.

11. The fluid filter according to claim 10, wherein the retention frame, the first filter material and the second filter material are integrally molded.

12. The fluid filter according to claim 10, wherein the retention frame comprises a first rib extending in a direction crossing the fold line direction of the first filter material, and a second rib extending in a direction crossing the fold line direction of the second filter material, and wherein the retention interval of the first filter material in the fold line direction is an interval obtained by dividing a length in the fold line direction of the first filter material into a plurality of parts at substantially equal intervals by the first rib, and the retention interval of the second filter material in the fold line direction is an interval obtained by dividing a length in the fold line direction of the second filter material into a plurality of parts at substantially equal intervals by the second rib.

* * * * *